US009260906B2

(12) United States Patent
Schreiber

(10) Patent No.: US 9,260,906 B2
(45) Date of Patent: Feb. 16, 2016

(54) SPACER FOR INSULATING GLAZING UNITS

(71) Applicant: SAINT-GOBAIN GLASS FRANCE, Courbevoie (FR)

(72) Inventor: Walter Schreiber, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/357,164

(22) PCT Filed: Dec. 20, 2012

(86) PCT No.: PCT/EP2012/076341
§ 371 (c)(1),
(2) Date: May 8, 2014

(87) PCT Pub. No.: WO2013/104507
PCT Pub. Date: Jul. 18, 2013

(65) Prior Publication Data
US 2014/0311065 A1    Oct. 23, 2014

(30) Foreign Application Priority Data
Jan. 13, 2012   (EP) .................................. 12151116

(51) Int. Cl.
*E06B 3/663*     (2006.01)
*E06B 3/673*     (2006.01)

(52) U.S. Cl.
CPC .......... *E06B 3/66304* (2013.01); *E06B 3/66319* (2013.01); *E06B 3/6733* (2013.01); *E06B 2003/6638* (2013.01); *Y10T 29/49826* (2015.01); *Y10T 428/24975* (2015.01)

(58) Field of Classification Search
CPC ....... E06B 3/24; E06B 3/263; E06B 3/26301; E06B 3/2632; E06B 3/64; E06B 3/66; E06B 3/663; E06B 3/66328; E06B 3/6675; E06B 3/66309; E06B 3/66319; E06B 3/66342; E06B 3/67; E06B 3/6715; E06B 3/67304; E06B 3/66323; E06B 3/67326; E06B 3/66361; E06B 2003/663; E06B 2003/6638; E06B 2003/66385; E06B 3/66304; E06B 3/6733; B32B 17/06; B32B 17/10; B32B 2367/00; Y10T 29/49826; Y10T 428/24975
USPC ......... 52/204.593, 204.595, 204.599, 204.62, 52/171.3, 172, 309.1, 309.13, 786.1, 52/786.11, 786.13, 745.15; 428/34
See application file for complete search history.

(56) References Cited

U.S. PATENT DOCUMENTS 4,109,431 A * 8/1978 Mazzoni et al. ................. 52/172
4,613,530 A * 9/1986 Hood et al. ..................... 428/34

(Continued)

FOREIGN PATENT DOCUMENTS

CN    1377329 (A)    10/2002
CN    1678810 (A)    10/2005

(Continued)

OTHER PUBLICATIONS amcor, Ceramis Coating Technology, Oct. 2012, available at http://www.amcor.com/CMSPages/GetFile.aspx?guid=dbab33c8-3471-4e86-aa69-57dc76b525c1.*

(Continued)

*Primary Examiner* — Basil Katcheves
*Assistant Examiner* — Theodore Adamos
(74) *Attorney, Agent, or Firm* — Steinfl & Bruno LLP

(57) ABSTRACT

A spacer for a multiple-pane insulating glazing unit, at least having a composite composed of a glass-fiber-reinforced, polymeric main body having two pane contact surfaces, which extend parallel to one another, an adhesive surface, a glazing interior surface, and an insulation film on the adhesive surface or the adhesive surface and the connecting surfaces, where the insulation film has at least one polymeric film having a thickness of 10 μm to 100 μm, at least one polymeric layer having a thickness of 5 μm to 80 μm and also a metal layer having a thickness of 10 nm to 1500 nm or a ceramic layer having a thickness of 10 nm to 1500 nm.

19 Claims, 3 Drawing Sheets

(56) References Cited

U.S. PATENT DOCUMENTS

Figure 1:
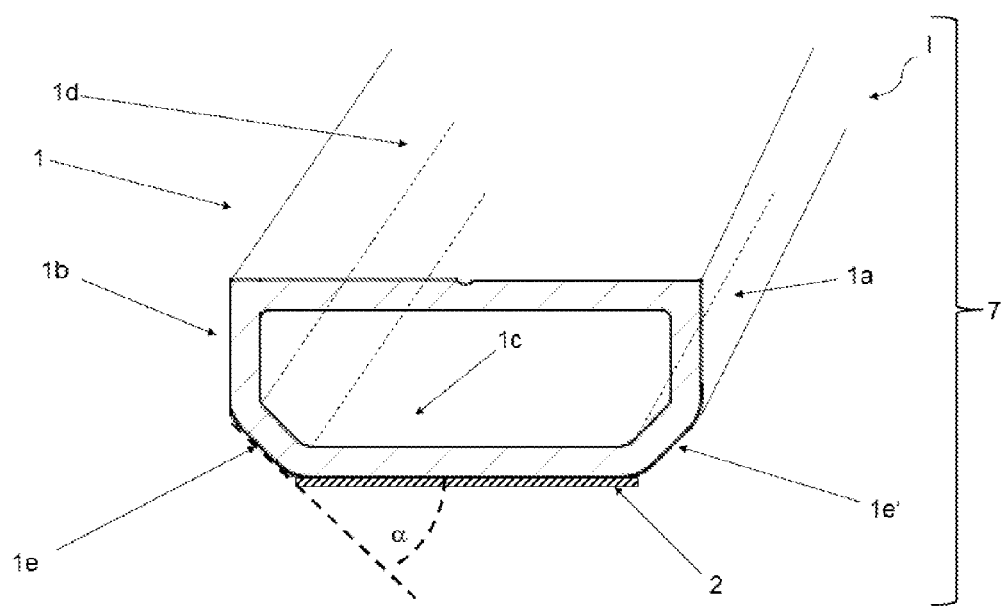

| | | | | |
|---|---|---|---|---|
| 4,799,745 | A * | 1/1989 | Meyer et al. | 359/360 |
| 4,831,799 | A * | 5/1989 | Glover et al. | 52/172 |
| 5,007,217 | A * | 4/1991 | Glover et al. | 52/172 |
| 5,071,206 | A * | 12/1991 | Hood et al. | 359/360 |
| 5,079,054 | A * | 1/1992 | Davies | 428/35.8 |
| 5,173,800 | A * | 12/1992 | King | 359/360 |
| 5,512,341 | A * | 4/1996 | Newby et al. | 428/35.8 |
| 5,962,090 | A * | 10/1999 | Trautz | 428/34 |
| 6,061,994 | A * | 5/2000 | Goer et al. | 52/786.13 |
| 6,250,045 | B1 * | 6/2001 | Goer et al. | 52/786.13 |
| 6,389,779 | B1 * | 5/2002 | Brunnhofer | 52/786.13 |
| 6,391,400 | B1 * | 5/2002 | Russell et al. | 428/34 |
| 6,537,629 | B1 | 3/2003 | Ensinger | |
| 6,796,102 | B2 * | 9/2004 | Virnelson et al. | 52/786.13 |
| 8,484,912 | B2 * | 7/2013 | Engelmeyer | 52/204.593 |
| 2005/0214487 | A1 * | 9/2005 | Trautz | 428/34 |
| 2009/0120019 | A1 * | 5/2009 | Trpkovski | 52/204.595 |
| 2009/0243802 | A1 * | 10/2009 | Wolf et al. | 340/10.1 |
| 2010/0107529 | A1 * | 5/2010 | Engelmeyer | 52/309.1 |
| 2014/0356557 | A1 | 12/2014 | Reichert | |

FOREIGN PATENT DOCUMENTS

| | | |
|---|---|---|
| DE | 4024697 | 2/1992 |
| DE | 19625845 | 1/1998 |
| DE | 198 05 348 A1 | 8/1999 |
| DE | 198 07 454 A1 | 8/1999 |
| EP | 0261923 | 3/1988 |
| EP | 0430889 | 6/1991 |
| EP | 0852280 | 7/1998 |
| WO | 01/16046 (A1) | 3/2001 |
| WO | 2004/005783 (A2) | 1/2004 |
| WO | 2008/022877 A1 | 2/2008 |
| WO | 2012/140005 (A1) | 10/2012 |

OTHER PUBLICATIONS

International Search Report mailed on Feb. 8, 2013 for PCT/EP2012/076341 filed on Dec. 20, 2012, German to English translation.

1—Written Opinion mailed on Feb. 8, 2013 for International Application No. PCT/EP2012/076341 filed on Dec. 20, 2012 in the name of Saint-Gobain Glass France (English Translation and German Original).

2—International Preliminary Report on Patentability issued on Jul. 15, 2014 for International Application No. PCT/EP2012/076341 filed on Dec. 20, 2012 in the name of Saint-Gobain Glass France (English Translation and German Original).

* cited by examiner

SPACER FOR INSULATING GLAZING UNITS

CROSS REFERENCE TO RELATED APPLICATIONS

The present application is the US national stage of International Patent Application PCT/EP2012/076341 filed on Dec. 20, 2012 which, in turn, claims priority to European Patent Application EP 12151116.6 filed on Jan. 13, 2012.

The invention relates to a spacer for insulating glazing units, an insulating glazing unit, and use thereof.

The thermal conductivity of glass is lower by roughly a factor of 2 to 3 than that of concrete or similar building materials. However, since panes are designed significantly thinner than comparable elements made of brick or concrete, buildings frequently lose the greatest share of heat via external glazing. This effect is particularly notable in high-rise buildings with partial or complete glass façades. The increased costs necessary for heating and air-conditioning systems make up a part of the maintenance costs of the building that must not be underestimated. Moreover, as a consequence of more stringent construction regulations, lower carbon dioxide emissions are required. Insulating glazing units are an important approach to a solution for this. Primarily as a result of increasingly rapidly rising prices of raw materials and more stringent environmental protection constraints, it is no longer possible to imagine the building construction sector without insulating glazings. Consequently, insulating glazing units constitute an increasingly greater share of outward-directed glazings. Insulating glazing units include, as a rule, at least two panes of glass or polymeric materials. The panes are separated from each other by a gas or vacuum space defined by a spacer. The thermal insulating capacity of insulating glass is clearly higher than for single plane glass and can be further increased and improved in triple glazings or with special coatings. Thus, for example, silver-containing coatings enable reduced transmission of infrared radiation and thus reduce heating of a building in the summer. In addition to the important property of thermal insulation, optical and aesthetic characteristics play an increasingly important role in the area of architectural glazing.

In particular in the case of buildings with an extensive glass exterior façade, the insulating effect plays an important role not merely for reasons of cost. Since the thermal insulation of very thin glass is, as a rule, worse than masonry, improvements are necessary in this area.

In addition to the nature and the structure of the glass, the other components of an insulating glazing unit are also of great significance. The seal and especially the spacer have a major influence on the quality of the insulating glazing unit.

Leaks within the spacer can easily result in a loss of an inert gas between the insulating glazings. In addition to an inferior insulating effect, this can easily result in moisture penetrating into the insulating glazing unit. Condensation formed by moisture between the panes of the insulating glazing unit thus quite significantly degrades the optical quality and, in many cases, makes replacement of the entire insulating glazing unit necessary.

One possible approach for the improvement of the seal and an associated reduction of the thermal conductivity is the application of a barrier foil on the spacer. This foil is usually fastened on the spacer in the region of the outer seal. Customary foil materials include aluminum or high-grade steel, which have good gas tightness. At the same time, the metal surface ensures good adhesion of the spacer to the sealing compound.

DE 40 24 697 A1 discloses a watertight multipane insulating glass comprising at least two glass panes and a profile spacer. Sealing is accomplished by polyvinylidene chloride films or coatings on the spacer. In addition, the edge gluing can be accomplished using a polyvinylidene chloride-containing solution.

EP 0 852 280 A1 discloses a spacer for multipane insulating glazing units. The spacer comprises a metal foil on the adhesive surface and a glass fiber content in the plastic of the main body.

DE 196 25 845 A1 discloses an insulating glass unit with a spacer made of thermoplastic olefins. The spacer has a water vapor permeability of less than 1 (g mm)/(mm$^2$ d) as well as high tensile strength and Shore hardness. Moreover, the spacer includes a gas-tight film as a water vapor barrier.

EP 0 261 923 A2 discloses a multipane insulating glazing unit with a spacer made of a moisture permeable foam with an integrated desiccant. The arrangement is preferably sealed by an external seal and a gas- and moisture-tight film. The film can contain metal-coated PET and polyvinylidene chloride copolymers.

The object of the invention consists in providing a spacer for an insulating glazing unit that enables improved long-term insulating action and, at the same time, simple assembly.

The object of the present invention is accomplished according to the invention by a spacer in accordance with the independent claim 1. Preferred embodiments emerge from the subclaims.

An insulating glazing unit according to the invention and use thereof according to the invention emerge from other subclaims.

The spacer according to the invention for multipane insulating glazing unit comprises at least a composite composed of a glass-fiber-reinforced, polymeric main body and a polymeric insulation film. Through the selection of the glass fiber content in the main body, the coefficient of thermal expansion of the main body can be varied and adapted. Through the adaptation of the coefficients of thermal expansion of the main body and of the polymeric insulation film, temperature-induced tension between the different materials and flaking of the insulation film can be avoided. The main body preferably has a glass fiber content from 20% to 50%, particularly preferably from 30% to 40%. The glass fiber content in the main body improves strength and stability at the same time. The main body comprises two pane contact surfaces running parallel to each other, an adhesive surface, and a glazing interior surface. The first pane contact surface and the second pane contact surface as well as the adhesive surface are connected to each other directly or, alternatively, via connecting surfaces. The preferably two connecting surfaces preferably have an angle from 30° to 60° relative to the pane contact surfaces. The insulation film is situated on the adhesive surface or, alternatively, on the adhesive surface and the connecting surfaces. The insulation film includes at least one polymeric film. At least one additional polymeric layer having a thickness from 10 µm to 100 µm as well as a metal or ceramic layer having a thickness from 10 nm to 1500 nm are applied on the polymeric film.

In a preferred embodiment, the polymeric layer has a thickness from 5 µm to 80 µm. In another preferred embodiment, the thickness of the polymeric layer is 10 µm to 80 µm.

In a particularly preferred embodiment, the polymeric film and the polymeric layer are made from the same material. This is particularly advantageous since less diversity of the materials used simplifies the production cycle. The polymeric film and the polymeric layers are preferably used in the same material thickness such that the same starting material can be used for all polymeric components of the insulation film.

The insulation film preferably contains at least two metal layers and/or ceramic layers, which are arranged alternatingly with at least one polymeric layer. For example, the insulation film can be made of a polymeric film on which a metal layer is situated, a polymeric layer fixed thereon, and a second metal layer. However, preferably, the outward-lying layers contain polymer and are formed from the polymeric film and/or the polymeric layer. Ceramic layers and metal layers can also be used within an insulation film. The alternating components of the insulation film can be bonded to each other or applied on each other according to extremely varied methods of the prior art. Methods for the deposition of metal or ceramic layers are sufficiently known to the person skilled in the art. The bonding of the individual components can be accomplished using an adhesive. The use of an insulation film with an alternating layer sequence is advantageous with regard to the leakproofness of the system. A defect in one of the layers does not result in a loss of function of the insulation film. In contrast, in the case of a single layer, even a small defect can result in a complete failure. Furthermore, the application of multiple thin layers is advantageous compared to a thick layer, since with increasing layer thickness, the risk of internal adhesion problems increases. Also, thicker layers have higher conductivity such that such a film is less suitable thermodynamically.

The insulation film preferably has gas permeation of less than 0.001 g/(m² h).

The composite composed of the main body and insulation film preferably has a PSI value less than (equal to) 0.05 W/mK, particularly preferably less than (equal to) 0.035 W/mK. The value 0.035 W/mK means that, in the composite, per meter of edge length and per Kelvin of temperature difference, less than 0.035 Watt is lost. The insulation film can be applied, for example, glued on the main body. Alternatively, the insulation film can be co-extruded together with the main body.

The polymeric film and/or polymeric layer preferably contain polyethylene terephthalate, ethylene vinyl alcohol, polyvinylidene chloride, polyamides, polyethylene, polypropylene, silicones, acrylonitriles, polyacrylates, polymethyl acrylate, and/or copolymers or mixtures thereof.

The metal layer preferably contains iron, aluminum, silver, copper, gold, chromium, and/or alloys or mixtures thereof. The metal layer has a thickness from 10 nm to 400 nm, preferably a thickness from 10 nm to 300 nm, particularly preferably a thickness from 10 nm to 200 nm. In an alternative embodiment, the metal layer has a thickness from 30 nm to 400 nm. Within the layer thicknesses mentioned, it was possible to observe particularly good leakproofness of the insulation film.

The metal layer is preferably applied on the insulation film by vapor deposition.

The ceramic layer preferably contains silicon oxides and/or silicon nitrides. The ceramic layer preferably has a thickness from 10 nm to 200 nm.

The polymeric layer preferably has a thickness from 5 μm to 80 μm, particularly preferably 10 μm to 80 μm.

The polymeric film preferably has 1 to 4 metal or ceramic layers. The polymeric film preferably has 1 to 4 polymeric layers.

The polymeric film preferably has 2 metal or ceramic layers and 2 polymeric layers in alternating metal/polymeric succession. The polymeric film particularly preferably has 3 metal layers and 3 polymeric layers in alternating metal/polymeric succession.

The main body preferably has, along the glazing interior surface, a length or width from 5.5 mm to 8 mm. The precise diameter is determined by the dimensions of the insulating glazing unit and the desired size of the interspace.

The main body preferably has, along the pane contact surfaces, a length or height from 5 mm to 30 mm.

The main body preferably contains a desiccant, preferably silica gels, molecular sieves, $CaCl_2$, $Na_2SO_4$, activated charcoal, silicates, bentonites, zeolites and/or mixtures thereof. The desiccant is preferably incorporated into a porous part of the main body. The desiccant is preferably co-extruded with the main body. The glazing interior surface preferably has openings that permit absorption of atmospheric moisture by the desiccant incorporated into the main body.

The main body preferably contains polyethylene (PE), polycarbonates (PC), polypropylene (PP), polystyrene, polybutadiene, polynitriles, polyesters, polyurethanes, polymethyl methacrylates, polyacrylates, polyamides, polyethylene terephthalate (PET), polybutylene terephthalate (PBT), preferably acrylonitrile butadiene styrene (ABS), acrylonitrile styrene acrylester (ASA), acrylonitrile butadiene styrene—polycarbonate (ABS/PC), styrene acrylonitrile (SAN), PET/PC, PBT/PC, and/or copolymers or mixtures thereof.

The invention further comprises an insulating glazing unit with at least two panes and a spacer according to the invention surrounding the panes. An outer insulation, preferably a plastic sealing compound, is situated in an edge space between the panes and the spacer according to the invention. The outer insulation preferably includes polymers or silane-modified polymers, particularly preferably organic polysulfides, silicones, RTV (room temperature vulcanizing) silicone rubber, HTV (high temperature vulcanizing) silicone rubber, peroxide vulcanizing silicone rubber, and/or addition vulcanizing silicone rubber, polyurethanes, butyl rubber, and/or polyacrylates. The panes contain materials such as glass and/or transparent polymers. The panes preferably have optical transparency of >85%. In principle, different geometries of the panes are possible, for example, rectangular, trapezoidal, and rounded geometries. The panes preferably have a thermal protection coating. The thermal protection coating preferably contains silver.

In order to be able to completely exploit energy-saving possibilities, the insulating glazing unit can be filled with a noble gas, preferably argon or krypton, which reduces the heat transfer value in the insulating glazing interspace.

The invention further includes the use of a spacer according to the invention in multipane glazing units, preferably in insulating glazing units.

Figure 2:
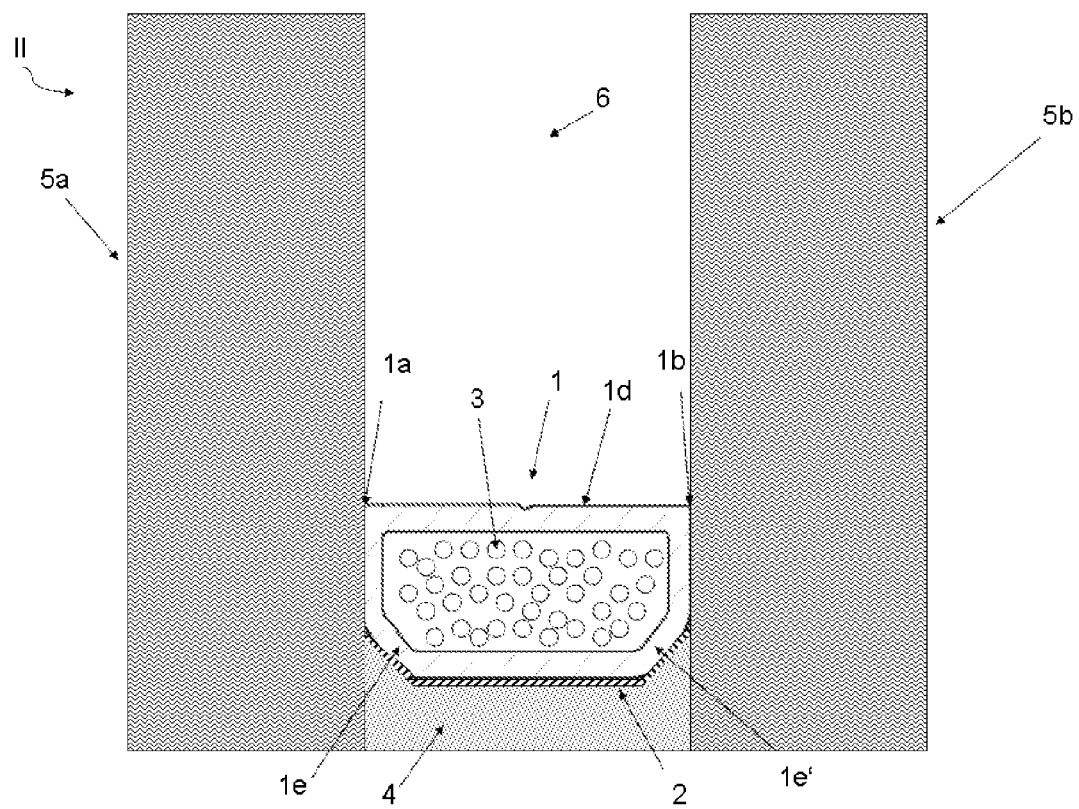
Figure 3:
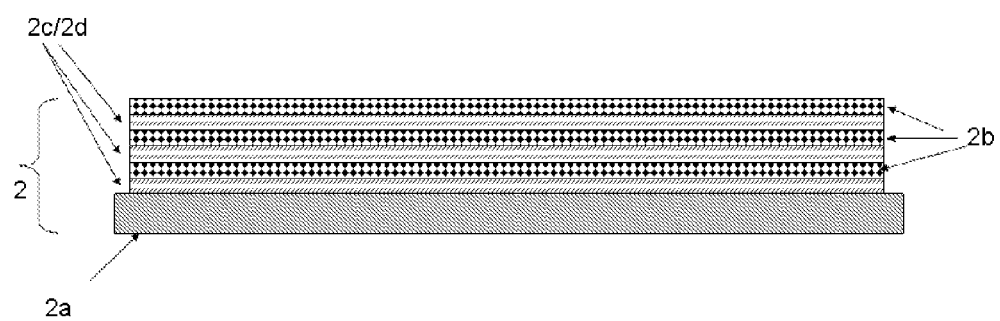

In the following, the invention is explained in detail with reference to drawings. The drawings are purely schematic and not true to scale. They in no way restrict the invention. The drawings depict:

FIG. 1 a cross-section of the spacer according to the invention,

FIG. 2 a cross-section of the insulating glazing unit according to the invention, and FIG. 3 a cross-section of the insulation film according to the invention.

FIG. 1 depicts a cross-section of the spacer (I) according to the invention. The glass-fiber-reinforced polymeric main body (1) comprises two pane contact surfaces (1a, 1b) running in parallel, which produce the contact with the panes of an insulating glazing unit. The pane contact surfaces (1a, 1b) are connected via an outer adhesive surface (1c) and a glazing interior surface (1d). Two angled connecting surfaces (1e, 1e') are preferably arranged between the adhesive surface (1c) and the pane contact surfaces (1a, 1b). The connecting surface (1e, 1e') preferably runs at an angle α (alpha) from 30° to 60° relative to the adhesive surface (1c). The-glass-fiber-reinforced polymeric main body (1) preferably contains styrene acrylonitrile (SAN) and roughly 30 wt.-% to 40 wt.-% glass fibers. The angled shape of the first connecting surface (1e) and of the second connecting surface (1e') improves the stability of the glass-fiber-reinforced polymeric main body (1) and enables, as depicted in FIG. 2, improved gluing and insulation of the spacer (I) according to the invention. An insulation film (2), which comprises at least one polymeric film (2a) depicted in FIG. 3, one polymeric layer (2b), and a metal layer (2c) or ceramic layer (2d), is fixed on the adhesive surface (1c). The polymeric main body (1) and the insulation film (2) together yield a composite (7). The entire spacer (I) according to the invention has thermal conductivity of less than 10 W/mK and gas permeation of less than 0.001 g/m² h. The composite (7) according to the invention itself has a PSI value of less than 0.035 W/mK. The spacer according to the invention improves the insulating action.

FIG. 2 depicts a cross-section of the insulating glazing unit (II) according to the invention. The glass-fiber-reinforced polymeric main body (1) with the insulation film (2) fastened thereon is arranged between a first insulating glass pane (5a) and a second insulating glass pane (5b). The insulation film (2) is arranged both on the adhesive surface (1c) and the first connecting surface (1e) and the second connecting surface (1e'). Together with the outer insulating layer (4), the insulation film (2) insulates the pane interior (6) and reduces the thermal transfer from the glass-fiber-reinforced polymeric main body (1) into the pane interior (6). The insulation film can be fastened on the polymeric main body (1) with, for example, PUR hot melt adhesive. An insulating and adhesive layer (not shown) is preferably arranged between the pane contact surfaces (1a, 1b) and the insulating glass panes (5a, 5b). This preferably contains polymers or silane-modified polymers, particularly preferably organic polysulfides, silicones, RTV (room temperature vulcanizing) silicone rubber, HTV (high temperature vulcanizing) silicone rubber, peroxide vulcanizing silicone rubber, and/or addition vulcanizing silicone rubber, polyurethanes, butyl rubber, and/or polyacrylates. The first insulating glass pane (5a) and the second insulating glass pane (5b) preferably have the same dimensions and thicknesses. The panes preferably have optical transparency of >85%. The insulating glass panes (5a, 5b) preferably contain glass and/or polymers, preferably flat glass, float glass, quartz glass, borosilicate glass, soda lime glass, polymethyl methacrylate, and/or mixtures thereof. In an alternative embodiment, the first insulating glass pane (5a) and/or the second insulating glass pane (5b) can be implemented as a composite glass pane. The insulating glazing unit (II) according to the invention forms, in this case, a triple or quadruple glazing. A desiccant (3) is incorporated within the glass-fiber-reinforced polymeric main body (1). The desiccant (3) can be incorporated both inside a central hollow space or in the glass-fiber-reinforced polymeric main body (1) itself. The glazing interior surface (1d) preferably includes relatively small openings or pores that enable a gas interchange with the pane interior (6).

FIG. 3 depicts a cross-section of the insulation film (2) according to the invention. The insulation film (2) comprises one polymeric film (2a) (Ø12 μm) made of LLDPE (linear low-density polyethylene), 3 polymeric layers (2b) made of PET (Ø12 μm), and 3 metal layers (2c) made of aluminium (Ø50 nm). The metal layers (2c) and the polymeric layers (2b) are applied alternatingly in each case on the polymeric film (2a). The metal layers (2b) and the polymeric layers (2a) can also each have different layer thicknesses. The structure of the insulation film (2) according to the invention reduces the thermal conductivity of the insulation film compared to the conventional metal foils or plastic films. A composite (7) provided with the insulation film (2) and the glass-fiber-reinforced polymeric main body (1) mentioned according to the invention has a thermal conductivity of less than 10 W/mK. This low thermal conductivity of the spacer (I) according to the invention significantly increases the efficiency of an insulating glazing unit.

LIST OF REFERENCE CHARACTERS (1) glass-fiber-reinforced, polymeric main body
(1a) (first) pane contact surface
(1b) (second) pane contact surface
(1c) adhesive surface
(1d) glazing interior surface
(1e) (first) connecting surface
(1e') (second) connecting surface
(2) insulation film
(2a) polymeric film
(2b) polymeric layer
(2c) metal layer
(2d) ceramic layer
(3) desiccant
(4) outer insulating layer
(5a) first pane
(5b) second pane
(6) interior of the insulating glazing unit
(7) composite composed of (1) and (2)
(I) spacer according to the invention
(II) insulating glazing unit according to the invention

The invention claimed is:

1. A spacer for a multipane insulating glazing unit comprising at least a composite composed of:
   a glass-fiber-reinforced, polymeric main body comprising:
      two pane contact surfaces running parallel to each other,
      an adhesive surface, and
      a glazing interior surface,
         wherein the pane contact surfaces and the adhesive surface are connected to each other directly or via connecting surfaces, and
   an insulation film on the adhesive surface or on the adhesive surface and the connecting surfaces,
      wherein the insulation film comprises:
         at least one polymeric film having a thickness from 10 μm to 100 μm,
         at least one polymeric layer having a thickness from 5 μm to 80 μm, and
         at least two layers alternating with the at least one polymeric layer selected from the group consisting of at least two metal layers each having a thickness from 10 nm to 1500 nm and at least two ceramic layers each having a thickness from 10 nm to 1500 nm.

2. The spacer according to claim 1, wherein the at least one polymeric film and the at least one polymeric layer are made from the same material.

3. The spacer according to claim 1, wherein the insulation film has gas permeation of less than 0.001 g/(m²h).

4. The spacer according to claim 1, wherein the composite has a PSI value less than 0.05 W/mK.

5. The spacer according to claim 1, wherein the at least one polymeric film and/or the at least one polymeric layer include polyethylene terephthalate, ethylene vinyl alcohol, polyvinylidene chloride, polyamides, polyethylene, polypropylene, silicones, acrylonitriles, polymethyl acrylate, any copolymers thereof or any mixtures thereof.

6. The spacer according to claim 1, wherein the at least two metal layers contain iron, aluminum, silver, copper, gold, chromium, any alloys thereof or any mixtures thereof.

7. The spacer according to claim 1, wherein the at least two metal layers have a thickness from 10 nm to 400 nm.

8. The spacer according to claim 7, wherein the at least two metal layers have a thickness from 10 nm to 200 nm.

9. The spacer according to claim 1, wherein the at least two ceramic layers contain silicon oxides, silicon nitrides or mixtures of silicon oxides and silicon nitrides.

10. The spacer according to claim 1, wherein the at least one polymeric layer has a thickness from 10 μm to 80 μm.

11. The spacer according to claim 1, wherein the insulation film has 2 to 4 metal layers or ceramic layers.

12. The spacer according to claim 1, wherein the insulation film has 1 to 4 polymeric layers.

13. The spacer according to claim 1, wherein the main body has, along the adhesive surface and the glazing interior surface, a length or width from 5.5 mm to 8 mm.

14. The spacer according to claim 1, wherein the main body has, along the pane contact surfaces, a length from 5 mm to 30 mm.

15. The spacer according to claim 1, wherein the main body contains a desiccant, including at least one of silica gels, molecular sieves, $CaCl_2$, $Na_2SO_4$, activated charcoal, silicates, bentonites, and zeolites.

16. The spacer according to claim 1, wherein the main body contains at least one of polyethylene (PE), polycarbonates (PC), polypropylene (PP), polystyrene, polybutadiene, polynitriles, polyesters, polyurethanes, polymethyl methacrylates, polyacrylates, polyamides, polyethylene terephthalate (PET), polybutylene terephthalate (PBT), acrylonitrile styrene acrylester (ASA), acrylonitrile butadiene styrene-polycarbonate (ABS/PC), styrene acrylonitrile (SAN), PET/PC, PBT/PC, and acrylonitrile butadiene styrene (ABS).

17. The spacer according to claim 16, wherein the main body contains at least one copolymer of polyethylene (PE), polycarbonates (PC), polypropylene (PP), polystyrene, polybutadiene, polynitriles, polyesters, polyurethanes, polymethyl methacrylates, polyacrylates, polyamides, polyethylene terephthalate (PET), polybutylene terephthalate (PBT), acrylonitrile styrene acrylester (ASA), acrylonitrile butadiene styrene-polycarbonate (ABS/PC), styrene acrylonitrile (SAN), PET/PC, PBT/PC, and acrylonitrile butadiene styrene (ABS).

18. An insulating glazing unit comprising:
at least two panes,
the spacer according to claim 1 surrounding the panes, and
an outer insulating layer.

19. A method comprising:
arranging the spacer according to claim 1 between a first glass pane and a second glass pane in a multipane insulating glazing unit.

* * * * *